United States Patent Office 3,080,608
Patented Mar. 12, 1963

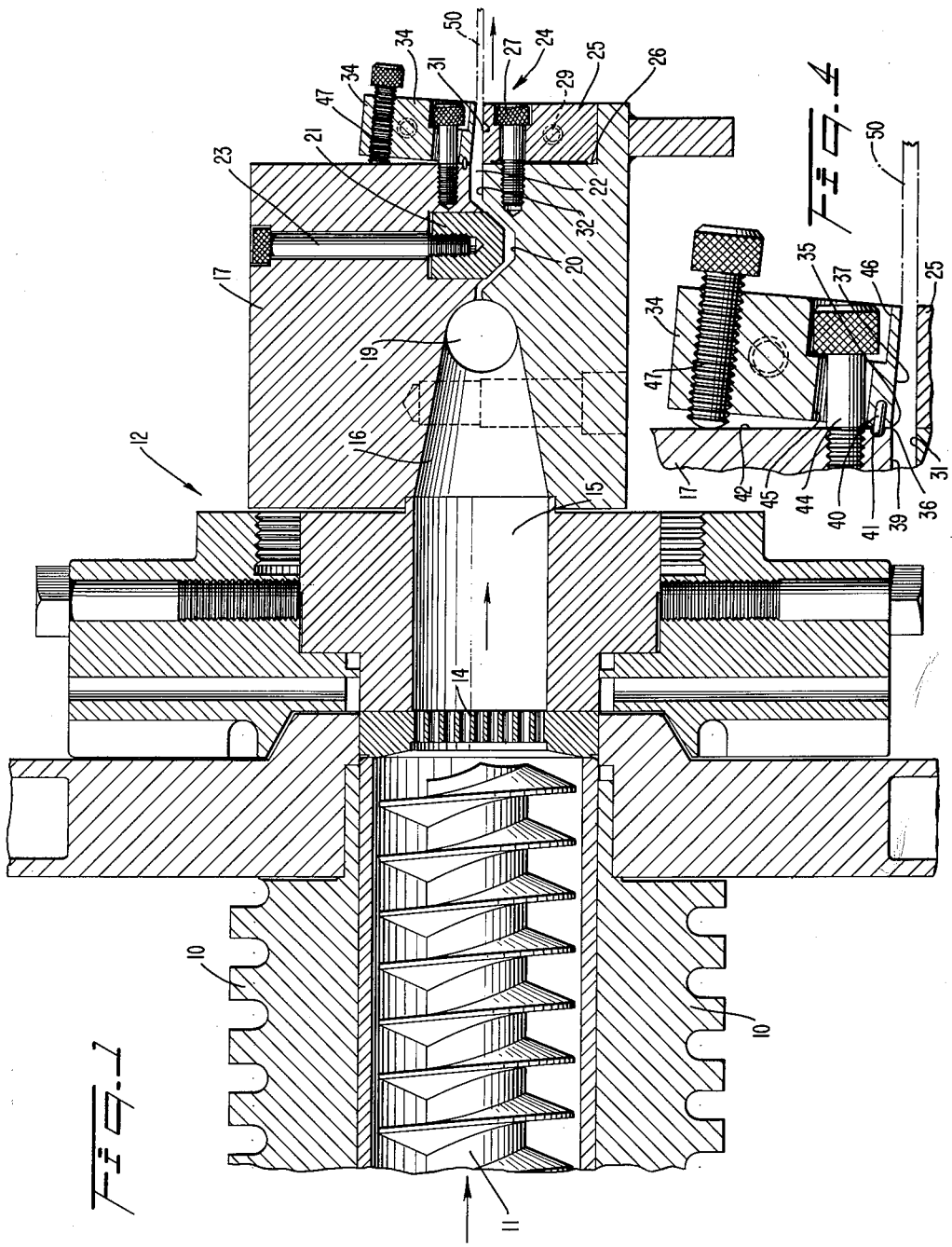

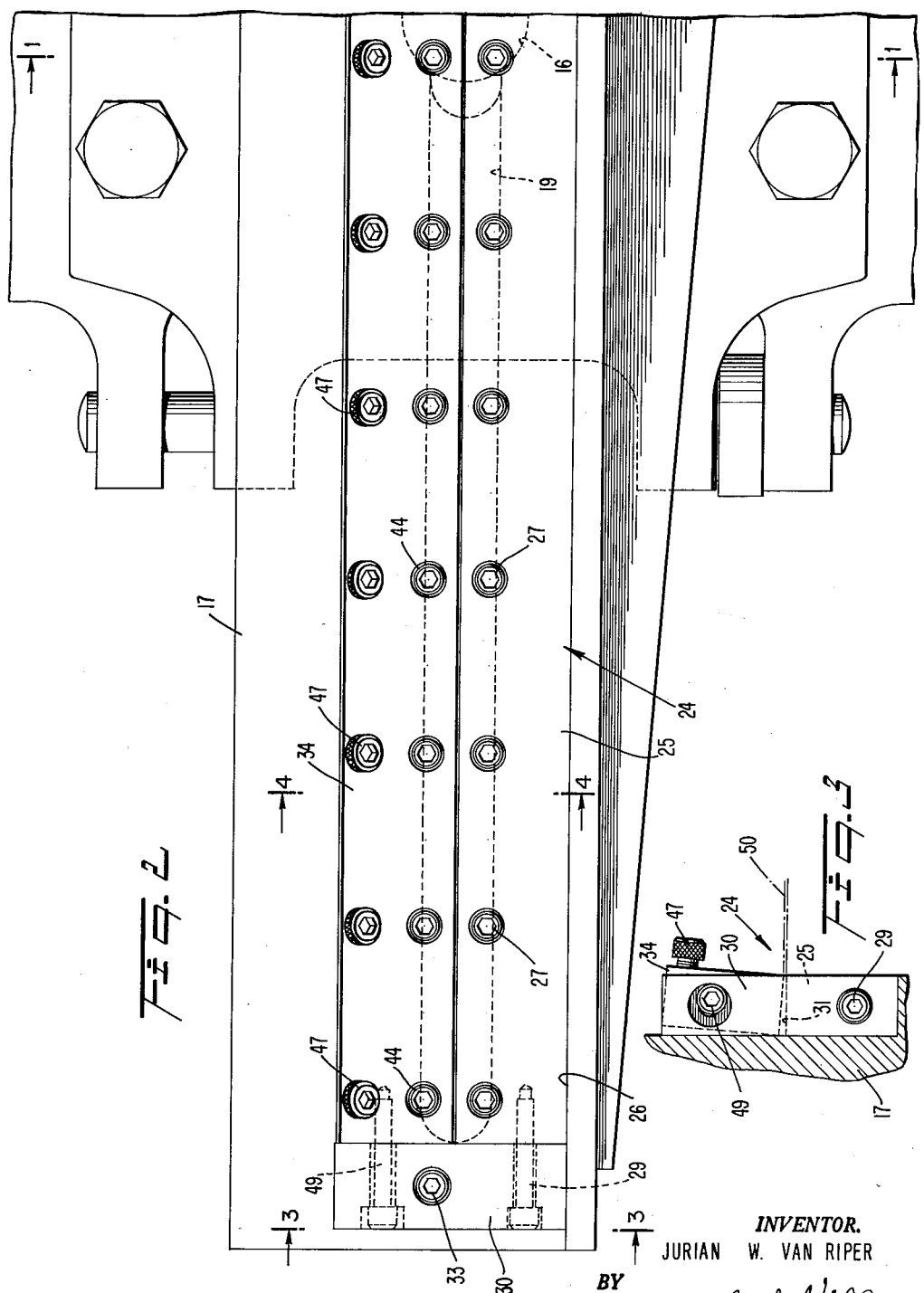

3,080,608
PLASTIC MATERIAL EXTRUSION APPARATUS
Jurian W. Van Riper, 208 Beechwood Road,
Ridgewood, N.J.
Filed Mar. 30, 1961, Ser. No. 99,518
6 Claims. (Cl. 18—12)

This invention relates to an extrusion head for plastic material extrusion apparatus.

The invention has among its objects the provision of a preferred extrusion head, such head being particularly adapted for extruding plastic material in laterally extended form.

A further object of the invention resides in the provision, in plastic material extrusion head, of an improved extrusion die and of means for adjustably mounting such die on the extrusion head.

Another object of the invention is the provision of a novel die of the character indicated and mounting and adjusting means therefor, such die being particularly characterized by its economy of manufacture and maintenance.

Still another object of the invention lies in the provision of an improved die for extruding plastic material, such die being easily adjusted, and accurately maintaining its adjustment as to the thickness of the stock extruded therethrough in the various zones thereof throughout its lateral extent.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in longitudinal axial section through the forward, delivery end of the barrel of a screw-type extruding machine, a lateral delivery head secured to the forward end of such barrel, and a preferred embodiment of die in accordance with the invention secured to the head, certain of the parts being shown in elevation, the section being taken along the line 1—1 of FIG. 2;

FIG. 2 is a fragmentary view in end elevation of the apparatus of FIG. 1, the view being taken in the direction from right to left in FIG. 1, FIG. 2 showing one lateral half of the apparatus;

FIG. 3 is a fragmentary view in vertical section through the extrusion head of FIGS. 1 and 2, the section being taken along the line 3—3 of FIG. 2; and FIG. 4 is an enlarged fragmentary vertical section through the die and a portion of the extrusion head, the section being taken generally along the line 4—4 of FIG. 2.

The improved plastic material extrusion head of the invention may be used to advantage in a variety of applications wherein plastic material is delivered under pressure to a passage in an extrusion head or the like and is shaped by such passage as it travels therethrough. The illustrative apparatus shown herein is a "sheeting" head which extrudes plastic material in the form of a thin sheet of uniform thickness. It is to be understood, however, that the present invention may be applied to extrusion apparatus for forming other shapes, which may vary in thickness in different lateral zones thereof. It is also to be understood that the extrusion die shown herein may be employed with other types of extrusion heads, including, for example, that shown and claimed in application Serial No. 35,362, filed June 10, 1960, now Patent No. 3,032,812, by the same inventor.

The novel extrusion apparatus of the present invention displays perhaps its maximum advantages when employed in the extrusion of wide relatively thin sheet material. Extrusion apparatus heretofore used for such purpose has been subject to marked difficulties both as to the initial adjustment of the die orifice and as to the maintenance of such orifice to accurate tolerances as to stock thickness throughout extended periods of use. It is conventional in such apparatus to employ one fixed die element at one side of the extrusion orifice and to employ an adjustable die element at the other side of the orifice. One of the die elements, usually the adjustable element, has been deeply slotted at spaced intervals throughout its lateral extent so that it may be locally distorted by adjusting studs which back up the respective zones of the element. Such dies have been expensive to make, and have been difficult to maintain in adjustment throughout extended periods of operation. Further, such prior construction presents difficulties because the slidably adjustable die element employed therein necessarily overlaps the exit end of the passage in the extrusion head in all but the position of its widest opening, thereby creating a zone in the plastic material immediately behind such die element which is stagnant and may tend to burn.

The apparatus of the present invention overcomes the above-outlined difficulties with prior plastic material extrusion apparatus of the type described. In accordance with preferred embodiments of the present invention, at least one adjustable die element is mounted so as to rock on its rear inner edge, which lies along the passage in the head. Accordingly, the passage through the head and between the opposing die elements has a generally smooth contour so that there is no tendency to trap portions of the plastic material in the stagnant zones. Preferably, the rockable die element is made stiff and rigid so that it moves as a whole and requires little, if any, localized adjustment. The embodiment of extrusion die shown, however, is such as to permit some local twisting of the rockable die element, if such is required, by variations inherent in the extrusion head as to the manner of distribution of the plastic material to the various laterally disposed zones of the extrusion passage.

Turning now to the drawings, there is shown in FIGS. 1 and 2 the forward end of the barrel 10 of a screw-type extrusion machine. An adapter 12 is connected to the forward end of barrel 10, such adapter having a central passage 15 therein. Plastic material forwarded by the stock screw 11 in barrel 10 passes through a conventional strainer 14 into passage 15 of adapter 12. Connected to adapter 12 is a laterally extended extrusion head having a body 17, such head being adapted, as above explained, for the extrusion of wide sheet plastic material of uniform thickness.

Within the body 17 there is a forwardly tapering passage 16, the rear end of the latter passage being aligned with and receiving plastic material from the forward end of passage 15. The forward end of passage 16 feeds into a laterally extended distributing passage 19 which, as shown in FIG. 2, extends laterally throughout the extent of the extruding orifice of the head. Forwardly of distributing passage 19 the body 17 is provided with a metering passage 20 which extends laterally throughout the full width of the passage 19. The metering passage is adjustably restricted in its flow area by a vertically adjustable elongated metering block 21 which is adjustably held vertically by a plurality of elongated vertical studs 23, as shown. Forwardly of the metering block 21 the body 17 is provided with an elongated horizontal passage 22 through which plastic material is forwarded to the die 24.

The die 24 has two main parts 25 and 34. The lower die part or element 25 is fixedly positioned in a seat 26 provided on the forward end of the body 17 of the head. Die element 25 is held in place in the seat by a plurality of laterally spaced studs 27 which extend through the element and have threaded engagement at their inner ends with body 17. The die is provided with two end pieces of which one is shown at 30 in FIG. 2. Each of the end pieces, which close the ends of the orifice between die elements 25 and 34, is held on body 17 by a stud 33 passing therethrough and threadedly engaging body 17. A further, horizontally directed stud 29 passes through each end piece 30 and is threaded into die element 25, as shown. The upper surface 31 of die element 25 is positioned in alignment with and forms a prolongation of the lower main surface 32 of passage 22 in body 17.

The upper die element 34 is rockably supported above passage 22, there being provided means for holding element 34 in adjusted position whereby to adjust the vertical width of the orifice between the confronting faces of the die elements 25 and 34, and thus to produce an extruded product 50 of the desired thickness. As shown most clearly in FIG. 4, the lower inner edge 35 of die element 34 is engaged with the lower forward corner of the part of body 17 which forms the passage 22. Die element 34 is so positioned that its lower face 37 lies generally as a prolongation of the main upper surface 39 of passage 22.

Die element 34 is securely held in adjusted position, with edges 35 and 36 in engagement throughout their lengths. For this purpose the die element 34 is provided with a plurality of laterally spaced aligned pins 40 which are located in element 34 a short distance above edge 35. The rear ends of pins 40 extend beyond the rear surface of element 34 and are freely rockingly received within a plurality of generally hemispherical seats 41 in the forward face 42 of body 17. The engagement between pins 40 and seats 41 is such as accurately to locate die element 34 on body 17 throughout the range of angular adjustment of the former while permitting the edges 35 and 36 to remain in plastic material-tight engagement.

Die element 34 is provided with a plurality of laterally spaced clearance holes 45 having counterbores 46 at their outer ends. A plurality of headed studs 44 extend through holes 45 and are threaded into body 17. Element 34 is adjusted to the desired angularity with respect to body 17 by a plurality of studs 47 which extend through and have threaded engagement with a plurality of aligned holes in the upper part of element 34, the rear ends of studs 47 engaging the forward surface 42 of body 17. Element 34 is clamped to the upper ends of end pieces 30 by a horizontal stud, similar to stud 29, of which one is shown at 49. The holes in members 30 through which studs 49 pass are sufficiently large to permit free rocking adjustment of die element 34 when studs 44 and 49 are loosened. It will be apparent that element 34 may be adjusted by loosening studs 44 and 49 somewhat, turning studs 47 in the required direction, followed by the tightening of the studs 44 and 49.

It will be seen that the die 24 of the invention is simple and rugged in construction and is easily maintained and adjusted. Because of the alignment and engagement of edge 35 of the rockable die with edge 36 of the head in all adjusted positions of die element 34, there are no zones interposed into the path of the plastic material in which such material may stagnate. Plastic material extruded through the die of the invention is thus free from inclusion of burned or scorched fragments of material.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. Apparatus for extruding plastic material comprising an extrusion head having a plastic material conducting passage therein, the head being adapted to be connected to an extrusion machine having means delivering plastic material forwardly under pressure to said passage in the head, and a die mounted on the head, said die comprising a die element having an inner surface generally forming a prolongation of an inner surface of the passage, the die element having a straight rear edge at the surface of the passage, the edge of the head confronting said edge of the die element being straight, the said two edges being aligned and in plastic material-tight engagement with each other, and means angularly to adjust the die element about the said edge of the head whereby to change the thickness of section of the plastic material travelling forwardly past the die element.

2. Apparatus for extruding plastic material comprising an extrusion head having a plastic material conducting passage therein, the head being adapted to be mounted on an extrusion machine having means delivering plastic material forwardly under pressure to said passage in the head, and a die mounted on the head at the exit end of the passage, said die comprising a die element confronting and spaced from a first surface of the passage and having an inner surface generally forming a prolongation of a second, opposite surface of the passage, the die element having a straight rear edge at the surface of the passage, the edge of the head confronting said edge of the die element being straight, means to hold the said two edges in alignment and in plastic material-tight engagement with each other, and means angularly to adjust the die element about the said edge of the head whereby to change the thickness of section of the plastic material passing through the die.

3. Apparatus as defined by claim 2, wherein the means to hold the said two edges in alignment comprises guide pins mounted on one of the members consisting of the head and die element, and seats on the other of said members rockingly receiving the ends of the pins.

4. Apparatus as defined by claim 3, wherein the means to hold the said edge of the die element in engagement with the said edge of the head comprises studs passing through clearance holes in the die element and threaded into the head, and the means angularly to adjust the die element comprises studs threaded into the die element and having their ends abutting the head.

5. In apparatus for extruding plastic material having an extrusion head with a distributing passage therein, means for forwarding plastic material under pressure to said passage in the head, and a die mounted on the head so as to shape the material issuing from the passage in the head, the improved combination of extrusion head and die which comprises a first die element mounted on the head so as to form a prolongation of one side of the delivery passage, a second die element mounted on the head so as to form a prolongation of the opposite side of the delivery passage, at least one of said die elements being adjustable toward and away from the central plane of the passage, said one die element and the head having straight inner edges engaging each other at the rear end of said one die element, means to adjust the said one die element angularly about its said rear inner edge and to hold the said edges of the head and said die element in tight engagement with each other, and means bridging the ends of the two die elements to close the ends of the die orifice, said last named means being connected to the die elements and to the head.

6. Apparatus as claimed in claim 5, wherein the means bridging the ends of the die elements comprises a member extending across the two die elements at each end of the die, and comprising means to connect the members to each of die elements, the means connecting the members to the adjustable die element being so constructed and arranged as to permit the free rocking adjustment of the adjustable die when such last named connecting means is loosened.

References Cited in the file of this patent

UNITED STATES PATENTS

| | | |
|---|---|---|
| 2,727,275 | Nelson | Dec. 20, 1955 |
| 2,897,541 | Orsini | Aug. 4, 1959 |
| 2,975,475 | Heston | Mar. 21, 1961 |

FOREIGN PATENTS

| | | |
|---|---|---|
| 1,072,378 | Germany | Dec. 31, 1959 |
| 841,501 | Great Britain | July 13, 1960 |